G. C. OFFEN.
Safety-Attachments for Car-Trucks.

No. 145,122. Patented Dec. 2, 1873.

UNITED STATES PATENT OFFICE.

GEORGE C. OFFEN, OF PORTLAND, MAINE.

IMPROVEMENT IN SAFETY ATTACHMENTS FOR CAR-TRUCKS.

Specification forming part of Letters Patent No. 145,122, dated December 2, 1873; application filed August 30, 1873.

*To all whom it may concern:*

Figure 1:
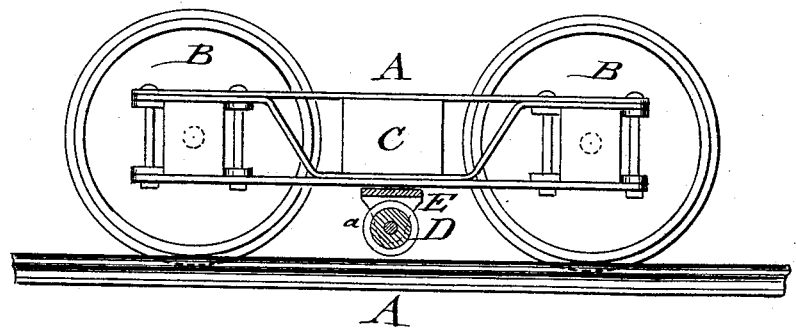
Figure 2:
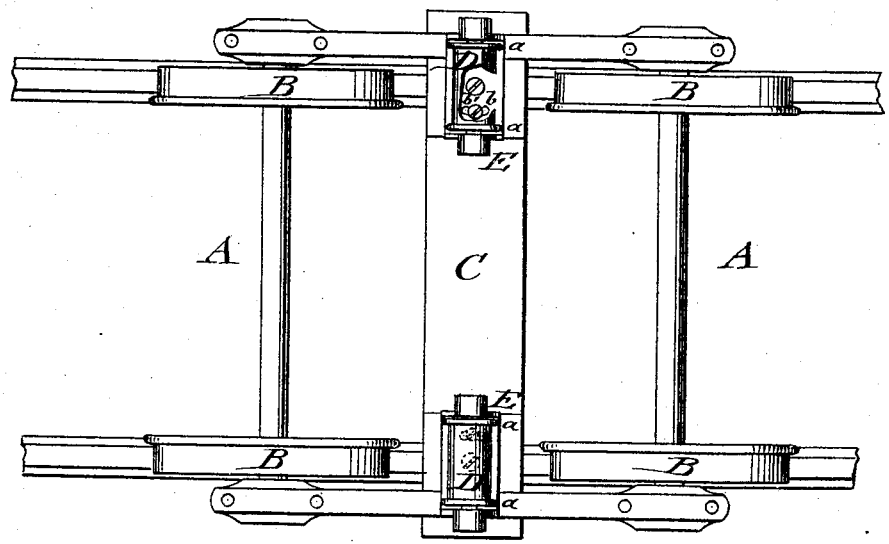

Be it known that I, GEORGE C. OFFEN, of Portland, in the county of Cumberland and State of Maine, have invented a new and Improved Safety Attachment for Car-Trucks, of which the following is a specification:

In the accompanying drawing, Figure 1 represents a side elevation of a car-truck with my safety attachment, and Fig. 2 a bottom view of the same.

Similar letters of reference indicate corresponding parts.

The invention will first be fully described, and then pointed out in the claim.

In the drawing, A represents the truck; B, the wheels; C, the lateral cross-piece, and D the safety-rollers attached to the lower side of piece C. The rollers D are about three times as wide as the truck-wheels, and provided with short side flanges $a$, and turn in bracket-shaped bearings E, which are pivoted in suitable manner to piece C, to keep square on the track in case the truck is thrown off the track. The rollers D are hung at such height above the track that they just clear the same, the flanges keeping the rollers on the track when thrown into use. A segmental slot, $b$, of the top plate of bearing E, together with a stop or pin, $b'$, limit the extent of side motion of the rollers, so that they cannot turn on the pivots too far to become unserviceable.

The rollers may be connected suitably to the engine, to notify the engineer when the wheels are off the track.

On the damaging or detaching of any wheel, the rollers carry immediately the truck, taking the place of the wheels, and may prevent, to a great extent, damage and accidents to track, car, and passengers.

Having thus described my invention, I claim as new and desire to secure by Letters Patent—

The pivoted bracket-bearing E, having segmental slot $b$, combined with stop $b'$ of cross-piece C, substantially as set forth.

GEORGE C. OFFEN.

Witnesses:
 THOMAS WEST,
 HARRY STEELE.